(No Model.) 2 Sheets—Sheet 1.
H. S. JEWELL.
APPARATUS FOR STEAMING GRAIN.
No. 484,099. Patented Oct. 11, 1892.
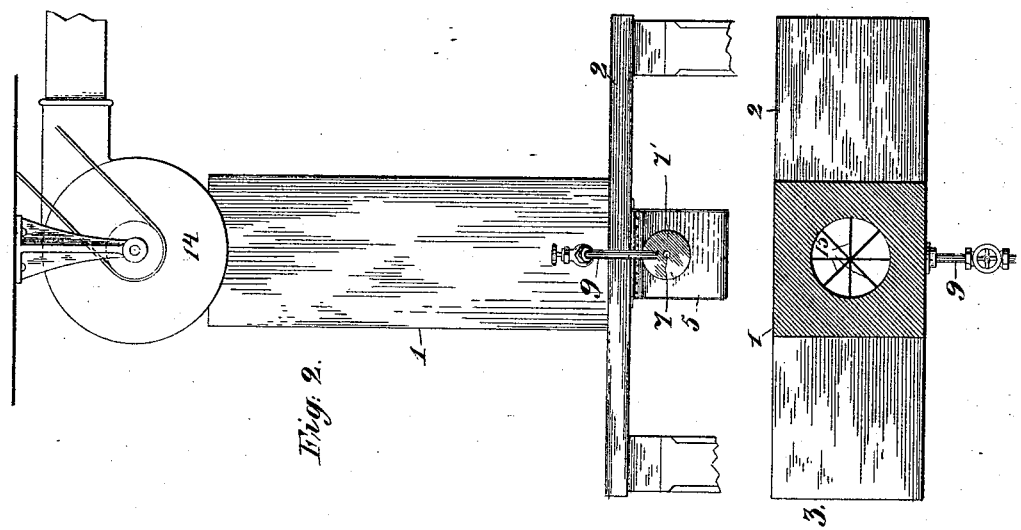
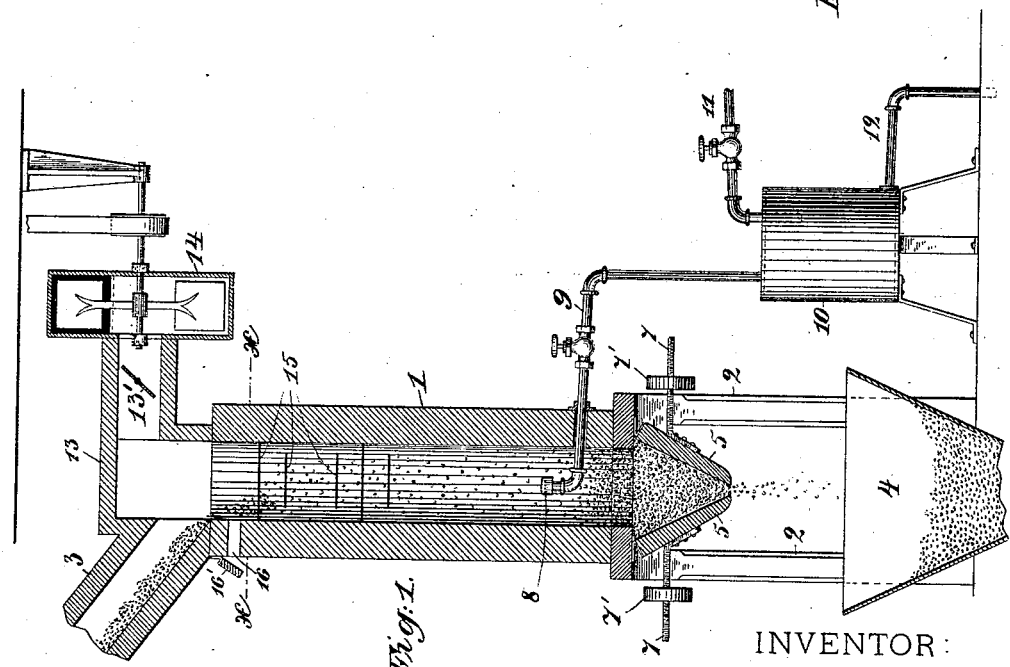
WITNESSES:
Herbert Blossom
Peter A. Ross
INVENTOR:
Herbert S. Jewell
By Henry Connett
Attorney.

(No Model.) 2 Sheets—Sheet 2.
H. S. JEWELL.
APPARATUS FOR STEAMING GRAIN.
No. 484,099. Patented Oct. 11, 1892.
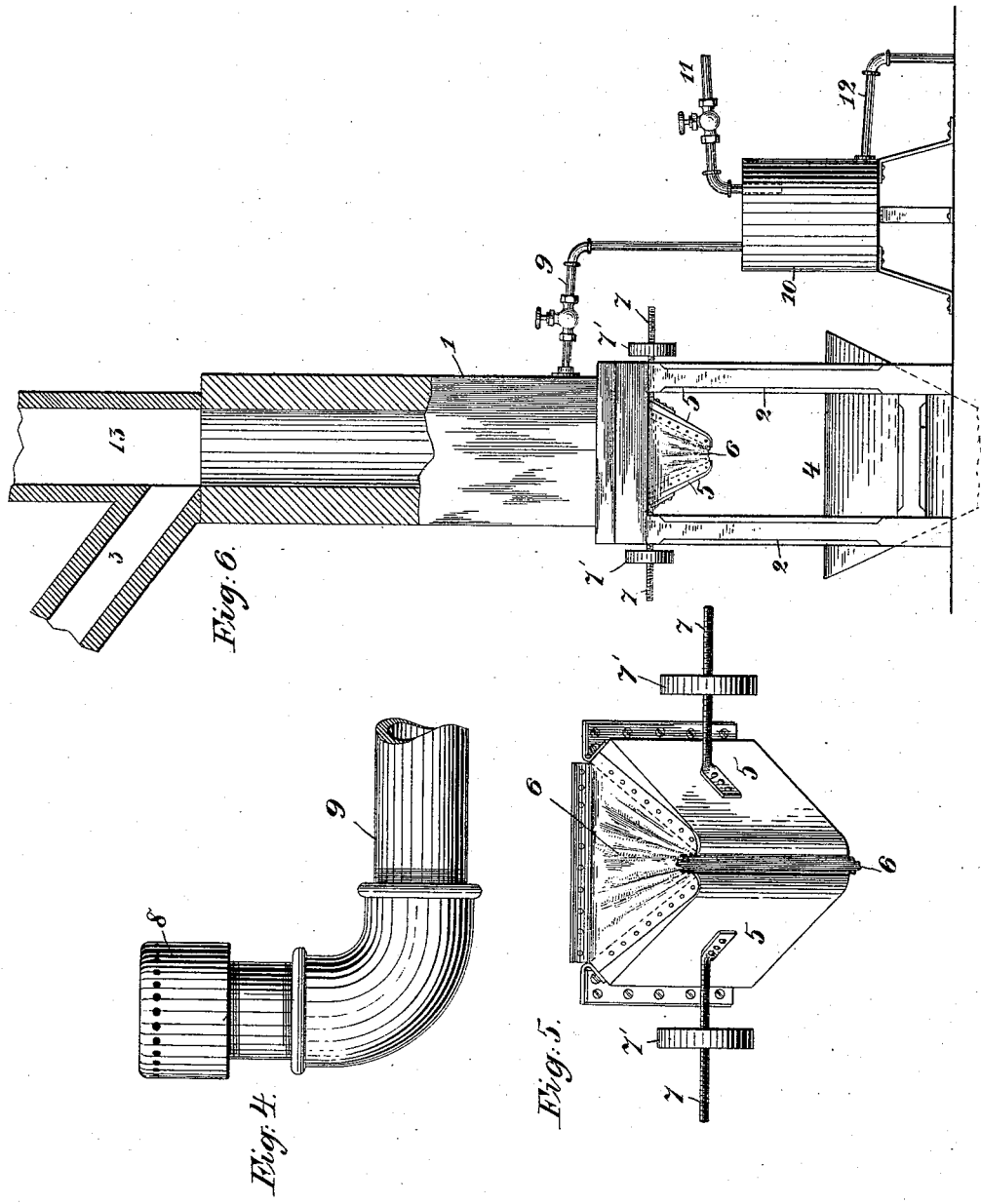
WITNESSES:
Herbert Blossom
Peter A. Ross
INVENTOR
Herbert S. Jewell
By Henry Connett
Attorney.

UNITED STATES PATENT OFFICE.

HERBERT S. JEWELL, OF BROOKLYN, NEW YORK.

APPARATUS FOR STEAMING GRAIN.

SPECIFICATION forming part of Letters Patent No. 484,099, dated October 11, 1892.

Application filed October 27, 1891. Serial No. 409,994. (No model.)

*To all whom it may concern:*

Be it known that I, HERBERT S. JEWELL, a citizen of the United States, and a resident of Brooklyn, Kings county, New York, have invented certain Improvements in Apparatuses for Steaming Grain, of which the following is a specification.

My invention relates to means employed for steaming wheat in order to toughen the bran before the wheat is ground. Such devices or apparatuses have been and are now employed; but these, so far as I am now aware, have defects which I seek to remedy. The difficulties encountered in steaming grain arises mainly from the excess of moisture created by condensation of the steam, which tends to moisten or soak the wheat too much. The water of condensation also mixes with the dust from the grain, thus forming a slime which fouls the grain and coats the inner surfaces of the apparatus.

The object of my invention is to avoid excessive condensation of the steam and to remove the dust from the inflowing wheat before it becomes moistened by the steam; and to this end I employ the apparatus I will now describe, with reference to the accompanying drawings, wherein—

Figure 1 is a sectional elevation of an apparatus embodying my invention. Fig. 2 is a front elevation of the same. Fig. 3 is a horizontal section of the same in the plane of the line *x x* in Fig. 1. Fig. 4 is an enlarged detail view of the steam-nozzle. Fig. 5 is a perspective view of the automatically-operating outlet-valve for the grain. Fig. 6 is a sectional elevation of the apparatus as it appears when the rotary air-exhauster is not employed.

1 is an upright conduit, which may, for convenience, be mounted on a suitable frame or support 2.

3 is the grain-inlet chute at the upper part of the conduit. At its lower extremity the conduit is provided with an automatically-operating outlet-valve, from which the steamed grain may fall into a hopper 4 or into any form of chute or receptacle.

The outlet-valve, which is seen detached in Fig. 5, is composed of two inclined flaps 5, hinged at their upper edges and forming, with sides 6 of some flexible material, as rubber or leather, a sort of variable hopper. The flexibility of the sides 6 permits this hopper to open or close to a limited extent at its lower or discharging end by the movement of the free lower edges of the flaps 5 away from or toward each other. Normally the flaps would stand as far apart as the flexible sides would permit; but I provide each flap with a rod 7, preferably screw-threaded, and a weight 7', preferably screw-threaded, so as to screw onto said rod. These weights tend to press the flaps inward or toward each other, so as to close the valve, the weights acting with a leverage due to their positions on the respective rods. When the grain falls into this hopper-like valve, it tends by its weight to force the flaps 5 apart, and thus provide an opening for its escape at the bottom, and by carefully adjusting the weights 7' in or out on their respective rods the valve may be made to hold just the desired quantity of grain to form a seal, the quantity held being augmented from above in exact proportion to its escape below. This valve is very sensitive and is capable of very nice regulation.

8 is the steaming-nozzle, arranged by preference in the axis of the conduit 1 and connected to the steam-pipe 9.

Fig. 4 shows the preferred mode of constructing the steaming-nozzle, which is in the nature of a cap, with lateral perforations screwed onto the upturned end of the steam-pipes.

In order to dry the incoming steam or at least to remove the water carried over by it from the boiler, I prefer to provide a drying apparatus consisting of a drum 10, into which steam is led from the boiler by a pipe 11 and from the upper part of which the steam is taken by the pipe 9. The water which collects in the drum 10 is drawn off through a trapped pipe 12. The object is to introduce steam into the conduit with as little water as possible, for this water after issuing from the steaming-nozzle would fall by gravity into the outlet-valve below and soak or moisten the grain unduly.

In order to remove the surplus steam, as well as the dust arising from the dry grain as it flows from the inlet-chute 3 into the conduit, I prefer to employ some means of creating an air-current flowing out from the upper end of the conduit, and a convenient means for effecting this object is to connect the upper end of the conduit 1 with a trunk 13, leading to an air-exhausting blower 14, as clearly illustrated in Figs. 1 and 2. However, the trunk 13 might lead to a chimney-flue with good results, provided said flue has sufficient draft; but I believe a blower or air-fan is best, as its work is more positive and reliable.

Fig. 6 shows the apparatus without the fan or air-exhauster.

In order to regulate the force of the draft produced in the trunk 13, I provide a valve 13' in said trunk, adapted for adjustment. This valve may be of any kind suited to the purpose.

In order to insure the removal of the dust from the grain as soon as the latter leaves the chute 3, I prefer to provide an air-inlet 16, formed in the wall of the conduit below said chute, whereat a broad sheet of air may enter, pass through the falling grain, and then pass on to the air-exhauster. This air-inlet should be provided with some sort of register or valve 16', so that the volume of air entering at it may be regulated. I find this air-inlet 16 especially useful where the grain contains more than the usual amount of dust.

The operation of my apparatus is simple. The grain and steam are turned on and the fan set in motion. The fan draws off the surplus steam and the dust, and the grain in falling through the length of the conduit will be sufficiently moistened to effect the object sought. As the grain falls into the outlet-valve below, it will accumulate in the valve to an extent governed by the position of the weights which tend to close the same, when it will open and the grain will flow out at the bottom of the valve as rapidly as it enters from above.

In order to avoid as far as possible any condensation of steam on the inner face of the conduit 1, I prefer to make this conduit of some material that will not conduct heat well or readily, preferring to employ wood, and to make its walls quite thick. A convenient mode of constructing the conduit is to take a square timber and bore it through from end to end to form the conduit. It may, however, be made up of several pieces. I find a cylindrical bore in the conduit produces better results than one having an angular cross-section.

In order to scatter the grain as it falls through the conduit, rods or bars 15 (seen in Figs. 1 and 3) may be placed diametrically across the same at different levels. Where the conduit is small a device for scattering the grain is not required; but for conduits of considerable size I prefer to employ the bars or rods 15, arranged as shown or in some equivalent manner.

I do not broadly claim the use of steam in connection with an air-exhauster in an apparatus for treating grain. The use of superheated steam in a grain-cleaning apparatus is not new; but I do not employ superheated steam, as my object is to moisten the grain, and in such an apparatus the greatest care must be taken to get rid of the surplus moist steam as well as the dust from the grain or the apparatus, and the grain treated as well will soon become foul. I so arrange the exhaust with respect to the grain-inlet that at the moment the grain passes into the upper end of the conduit, down which it falls by gravity, the dust is drawn therefrom along with the steam which has risen to this point. The prompt removal of the steam and dust prevents the formation of slime in the apparatus.

Having thus described my invention, I claim—

1. A grain-steaming apparatus having, substantially as described, for carrying off the surplus steam and the dust from the entering grain, arranged at the upper part of the apparatus where the grain enters, whereby the formation of slime in the apparatus is prevented.

2. A grain-steaming apparatus comprising an upright conduit having a grain-inlet at its upper part, a valve-controlled outlet at its lower part, a steam-nozzle within the conduit, and an air-exhausting mechanism connected with the upper part of said conduit for removing the surplus steam and the dust from the grain.

3. A grain-steaming apparatus having an automatically-regulated outlet-valve for the grain, said valve consisting of the hinged flaps 5, the sides 6, of flexible material, secured to and connecting the flaps 5, and adjustable weights on said flaps which tend to close the valve.

4. A grain-steaming apparatus comprising a conduit of wood or like non-heat-conducting material having an inlet for grain at its upper part and an outlet for the same at its lower part, a steam-nozzle arranged within said conduit, and means for drawing off the surplus steam and the dust at the upper part of said conduit.

5. A grain-steaming apparatus comprising a conduit having a grain-inlet at its upper part and a grain-outlet at its lower part, a steam-nozzle in said conduit, an air-exhauster, a trunk connecting said air-exhauster with the upper part of said conduit, and means for regulating the force of the draft through said trunk.

6. A grain-steaming apparatus comprising a conduit having a grain-inlet at its upper part, a grain-outlet at its lower part, and an air-inlet 16, arranged below the grain-inlet, a steam-nozzle arranged within said conduit, an air-exhauster, and a trunk connecting said air-exhauster with the upper part of said conduit, whereby the air entering at the inlet 16 is compelled to pass through the inflowing grain on its way to the air-exhauster.

In witness whereof I have hereunto signed my name in the presence of two subscribing witnesses.

HERBERT S. JEWELL.

Witnesses:
HENRY CONNETT,
HERBERT BLOSSOM.